Aug. 15, 1939.  F. V. PREVE  2,169,990
MANICURE BOWL
Filed Nov. 10, 1938
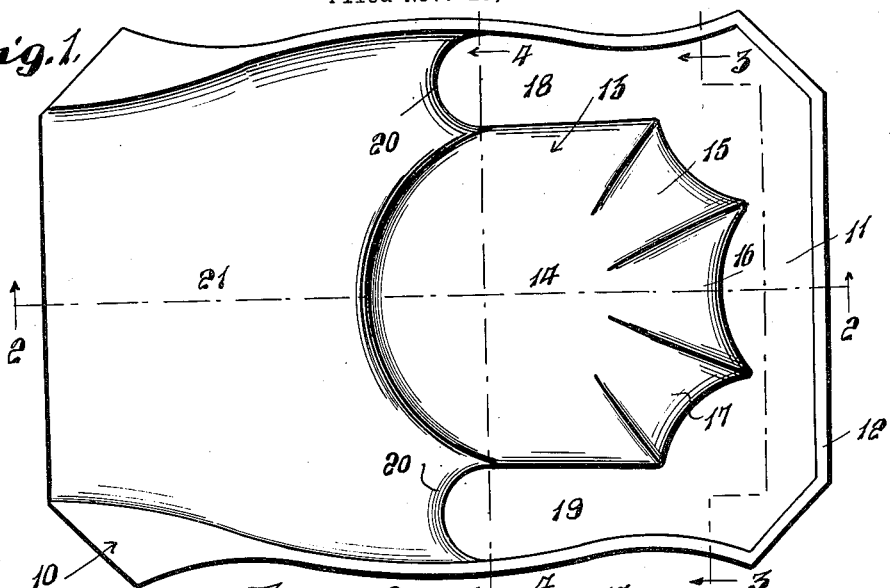
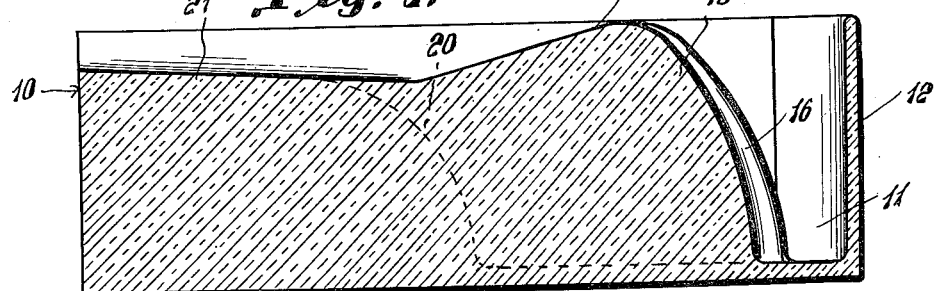
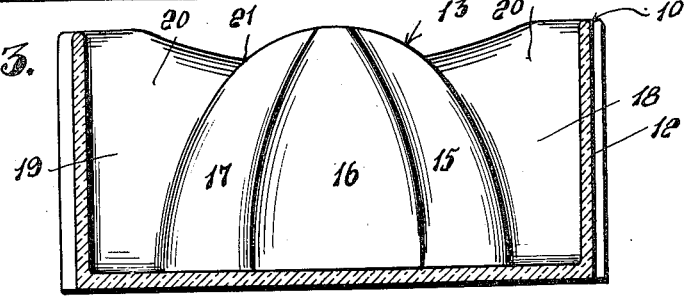
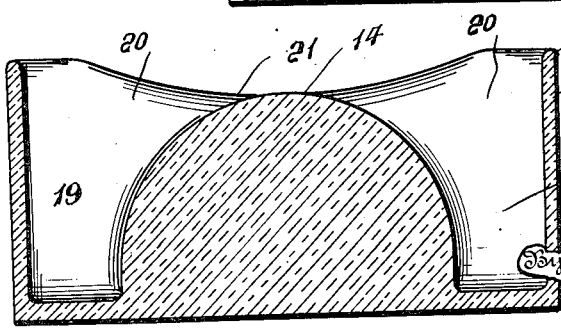
Inventor
Franco V. Preve
Attorney Patented Aug. 15, 1939

2,169,990

UNITED STATES PATENT OFFICE 2,169,990

MANICURE BOWL

Francois Victor Preve, Long Island City, N. Y.

Application November 10, 1938, Serial No. 239,881

3 Claims. (Cl. 132—73)

This invention relates to an improved manicure bowl particularly adapted for use in soaking the fingers for softening the skin and finger nails to properly condition them for being manicured.

More particularly, it is an aim of this invention to provide an improved bowl particularly adapted for use in manicuring having means for comfortably supporting the hand while the fingers are being soaked.

Other objects and advantages of the invention will hereinafter become more fully apparent from the following description of the drawing, which illustrates a preferred embodiment thereof, and wherein:

Figure 1 is a plan view of the invention,

Figure 2 is a longitudinal vertical sectional view taken along the line 2—2 of Figure 1, and Figures 3 and 4 are transverse vertical sectional views taken along the lines 3—3 and 4—4, respectively, of Figure 1.

Referring more particularly to the drawing, wherein like reference characters designate like or corresponding parts throughout the different views, 10 designates generally a block of a plastic material which is recessed at one end to form a container or bowl 11, adapted to contain a liquid to be used for softening the skin and nails of the fingers preparatory to manicuring, the container being surrounded by the wall 12.

The block 10 is molded to form a hand rest, designated generally 13 having a rounded or convex upper portion 14 adapted to fit and form a rest for the palm of a hand and the grooves 15, 16 and 17 in the forward part thereof in which are adapted to be positioned the three middle fingers to form rests for the fingers while extending into the bowl 11. The hand rest 13 is spaced, at its forward end and sides from the wall 12 so that the thumb and little finger may extend into the portions 18 and 19, respectively, of the bowl 11. The block 10 is beveled, as indicated at 20, at the ends of the portions 18 and 19 to provide surfaces on which the little finger and thumb may rest while extending into the bowl. The opposite end of the block 10 is grooved and inclined, on its upper surface, toward the hand rest 13, as indicated at 21, to provide a surface on which the heel of the hand and the wrist may be rested.

From the foregoing it will be seen, that the hand may be placed on the member 13 with the thumb extending into the portion 18, the three middle fingers resting in the grooves 15, 16 and 17 and extending into the forward part of the bowl, and the little finger extending into side 19 of the bowl so that all of the fingers of the hand may be simultaneously soaked by a liquid which partially fills the bowl portion 11. The palm, heel of the hand and wrist may be rested by the portions 14 and 21 so that it will require no effort on the part of the person whose fingers are being soaked, to allow the fingers to extend into the bowl 11, as the hand and wrist are comfortably supported, as heretofore described, and as the arm may be rested upon the same supporting surface as the block 10.

Various modifications and changes in the construction and arrangement of the parts forming the invention, are contemplated and may obviously be resorted to, and the right is therefore expressly reserved to make such variations and changes as fall within the spirit and scope of the invention as hereinafter defined by the appended claims.

I claim as my invention:

1. A manicurist's finger bowl comprising an elongated block recessed at one end to form a container, a hand rest extending into said container portion for supporting the palm of a hand with the fingers extending into said container, and the opposite end of said block being recessed to receive and support the wrist.

2. An article of the class described comprising an elongated block, the upper surface of one end of said block being provided with a longitudinally disposed arcuately shaped recess, the opposite end of said block being provided with a substantially U-shaped recess, and a convex portion extending into said U-shaped recess, the bottom of said block being flat to provide a base.

3. In an article of the class described, an elongated block of plastic material having a substantially flat bottom forming a base, the top of said block being provided with a convex portion adjacent one end, said end being recessed around said convex portion, and the opposite end of the block having a longitudinal arcuately shaped recess extending to the convex portion.

FRANCOIS VICTOR PREVE.